Oct. 5, 1926.
F. RICCA
1,602,170
CHANGEABLE INDICATING DEVICE
Filed April 13, 1926    2 Sheets-Sheet 1
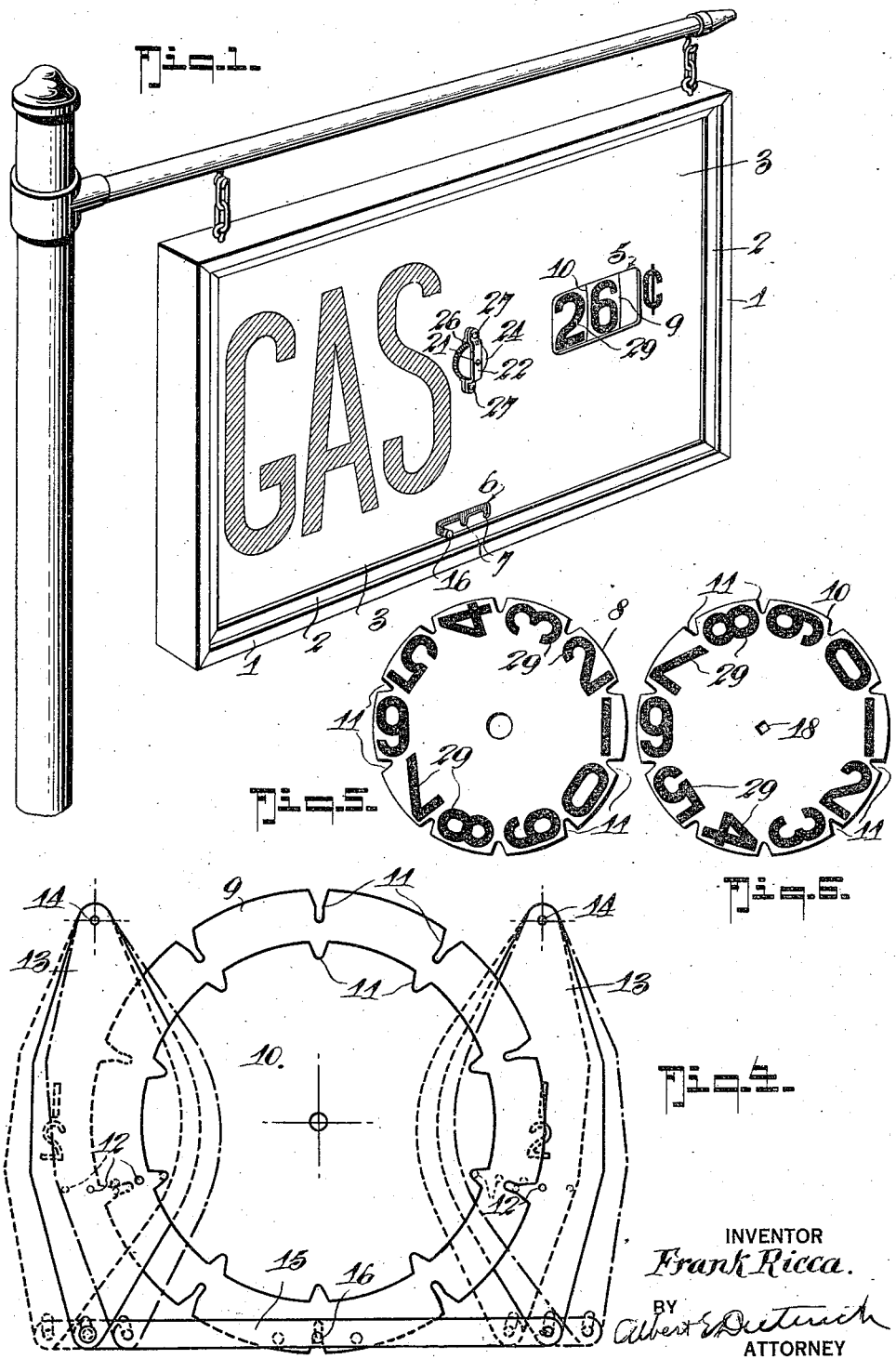
INVENTOR
Frank Ricca.
BY
ATTORNEY Oct. 5, 1926.  1,602,170
F. RICCA
CHANGEABLE INDICATING DEVICE
Filed April 13, 1926   2 Sheets-Sheet 2
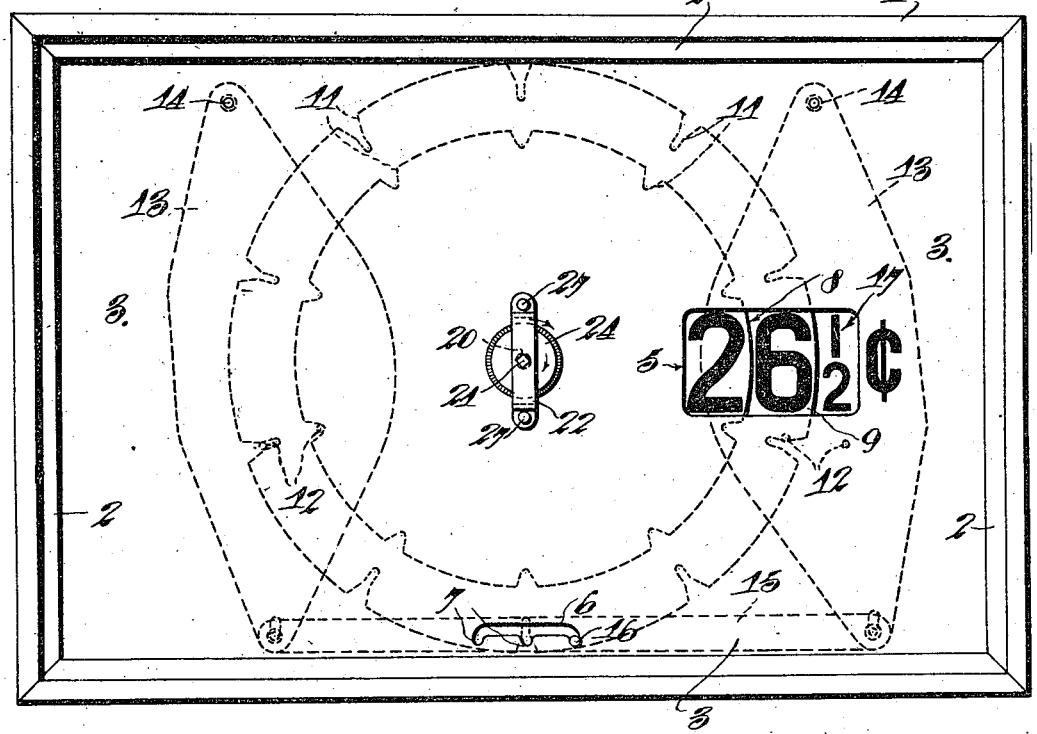
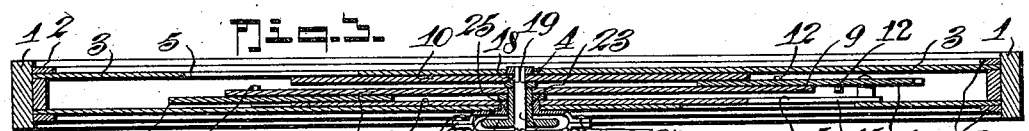
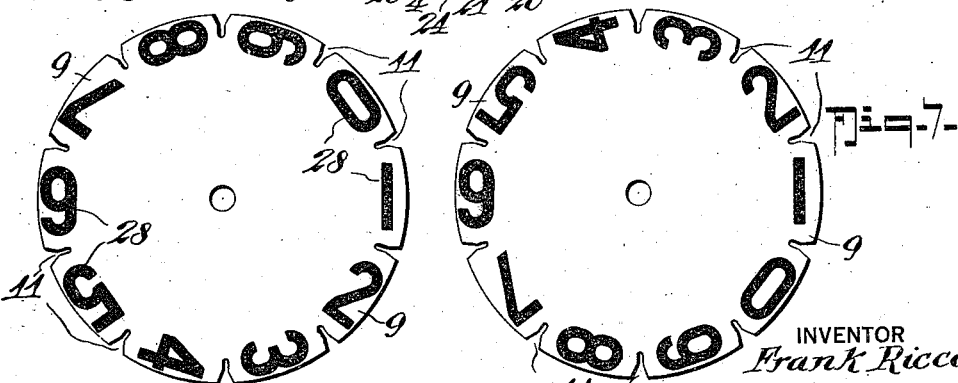
INVENTOR
Frank Ricca.
BY
Albert E Dieterich
ATTORNEY Patented Oct. 5, 1926.

1,602,170

UNITED STATES PATENT OFFICE.

FRANK RICCA, OF WHITE CASTLE, LOUISIANA.

CHANGEABLE INDICATING DEVICE.

Application filed April 13, 1926. Serial No. 101,783.

The invention generally relates to indicating apparatus and more particularly to that class of such devices as are adaptable to use for indicating prices and the like and which are capable of being readily adjusted to indicate changes in such prices as they fluctuate from day to day.

The invention primarily has for its object to provide a device of the class stated which is adapted for being suspended from or rigidly secured upon a suitable support in position for being viewed from either side and embodying mechanism for displaying at each side thereof a price or like indication readily changeable to compensate for fluctuations including half unit changes when necessary.

In its more detailed nature the invention seeks to provide an indicator sign of the character stated wherein is provided a framing, opposed face plates carried by the framing and each having an advertisement accommodating space on its exposed face and an observation window, a plurality of suitably marked indicating dials mounted between the plates and having portions thereof visible through the windows, means for moving all or selected ones of the dials to cause selected portions thereof to become visible, and shiftable stop and indicator devices shiftable in either of two directions to stop all or selected ones of the dials against movement and being suitably marked and positioned that when moved to a certain one of their shiftable positions they will add an indicator to those exhibited by the dials, as for example "½."

With the above and other objects in view that will hereinafter appear the invention still further resides in the novel details of construction, combination and arrangement of parts, all of which will be first fully described, then be particularly pointed out in the appended claims, reference being had to the accompanying drawings, in which:

Figure 1 is a perspective view illustrating the invention in use.

Figure 2 is a face view of the invention the dials and lock devices being indicated in dotted lines.

Figure 3 is an enlarged horizontal section of the invention.

Figure 4 is a diagrammatic face view illustrating the operation of the lock and indicator arms.

Figures 5 and 6 are face views of the front and back small dials respectively.

Figures 7 and 8 are face views of the front and rear faces of the large or middle dial respectively.

In carrying out the invention I provide an open rectangular frame 1 which is adapted to be suspended from or securely mounted upon a suitable support to provide for a display of both sides of the said frame. The frame is provided with a suitable central spacer rib, as indicated in Figure 3 of the drawings, and at each side of the said central rib with suitable keeper rails 2 adapted to secure the face plates 3 in the frame in opposed spaced relation.

Each of the face plates is provided with a central aperture 4 of varied diameters, a display window or opening 5 centrally at the right end of each thereof, the purpose for which will later appear. One of the face plates, hereinafter termed the front face plate, is provided with a control slot 6 having keeper depressions 7 in the bottom edge thereof one at each end and one in the middle, the purpose for which will later be described.

When my device is adapted for use in indicating the price of gasoline or the like, a very appropriate use for the same, a cent mark is positioned on the face plate adjacent the right hand end of the window thereof so as to be in position for being read in connection with the indicating mark as viewed through that window at a particular time.

To provide for the adjustable indicating feature of the invention I employ a plurality of indicating dials each having numerals at their edges adapted to be brought into position for being viewed through the windows of the face plates and adjustable in such a manner that the indications provided thereby may be varied from time to time, as may be found necessary, the markings on the said dials being so positioned that a like indication will be displayed through each face plate.

When the device is to be used as above referred to, it is only necessary to provide three dials, one large dial and two small dials, one of the latter being positioned at each side of the large dial and being so positioned in the space between the face plates that an area at the edge of each side of the large dial will be displayed through the window of a respective face plate in cooperation with a like sized area of that one of the small dials positioned at the respective side of the large dial.

The small dial adapted to be viewed through the front face plate will hereinafter be termed the front small dial and is indicated by the numeral 8. The large diameter or middle dial is indicated by the numeral 9 and 10 indicates the other small diameter or rear dial which is visible through the rear face plate. The several dials are illustrated in detail in Figures 5 to 8 inclusive.

Each dial is equipped at its peripheral edge with a plurality of equi-distantly spaced stop notches 11, those of the large dial 9 being continued radially inwardly a greater distance than are those of the smaller dials for a purpose later to be described.

The edge notches just referred to are adapted to receive stop pins 12, two thereof being secured to project from opposite faces of the indicator and locker arms 13, one of which is positioned at each side of the dials in position for having the said pins brought into engagement with selected ones of the edge notches of the said dials.

Each of the arms 13 is pivoted as at 14 to one of the face plates and the said arms are link connected as at 15 to move in unison. Thus, if the arms are moved in one direction the pins of one thereof will move into engagement with the stop notches at one side of the dials, while those at the other side will be moved away from the opposite edges of the dials, the said arms thus functioning selectively or alternately for a purpose later to be described.

A shifting lever 16 is secured to the link 15 and projects through the control slot 6 in position for being conveniently hand manipulated. When the lever is at a central position, resting in the central depression of the slot the indicator and lock arms will be at their neutral position out of engagement with the dial edges at either side. When the lever is moved into one or the other of the end depressions of the control slot the stop pins will be brought into engagement with the lock notches at one or the other of the sides of the dials according to the direction of movement of the lever.

In a manner that will later be described, the smaller dials are adapted to be rotated in unison and independently of the large dial. Thus, it is only necessary to provide each of the arms 13 with two oppositely directed lock pins 12, one for engaging the large dial notches and one for engaging those of one or the other of the small dials because by securing one of the small dials against movement the other is also secured against movement.

The stop pins 12 of each arm 13 are so spaced that the one thereof which engages the large dial will be brought into engagement with the outer portion of the stop notches thereof prior to engagement of the other stop pin of that arm with the respective small dial, thus making it possible to shift the said arm into position for stopping rotation of the large dial while still permitting free rotation of the small dials until the desired indication thereupon is brought into position for being displayed through the window when continued movement of the arm in the locking direction will force the large dial engaging stop pin into the continuation of the selected stop notch thereof and the other stop into locking engagement with the selected stop notch of the said small dial, thus locking all of the dials at their selected positions.

In the drawings, in Figure 1, I have illustrated the device as indicating a price of twenty-six cents. It is quite probable that at times the price for a stated commodity would be so many cents plus a half cent, in which event difficulty would be occasioned with common types of indicating devices. I have provided for such emergency by the provision of the pair of alternately operating arms 13, in a manner now to be described.

It will be observed that each of the arms has indicated thereon a "½" indication of a size and in position for being displayed through the respective window 5 through which the arm is displayed. When the arms are shifted in one direction to lock the dials against rotation and at a selected positioning the "½" indication will be brought into position for being displayed in connection with and at the end of the numbers displayed by the dials and when shifted in the opposite direction to a locking position the said "½" indication will be moved out of position for being viewed through the said windows. Thus, the locking arms have two directional functions, one which serves to lock the dials without any "½" indication and one which serves that purpose and in addition to display a "½" indication in connection with the dial indication.

It should be understood here that each of the front small dials has the numeral edge area thereof marked with numerals 0 to 9, those of the rear dial being arranged in clockwise sequence starting from the right hand side of the dial while those of the front small dial are arranged in a counter-clockwise sequence starting from the right hand side thereof. The large dial has the edge area at each face thereof marked with numerals 0 to 9, those at the front face thereof being similarly positioned to those of the front small dial and those at the rear face thereof being similarly positioned to those of the rear dial.

To provide for suitable selective rotation of the several dials, the small dials to rotate together in unison and the central or larger dial independently thereof, I provide the rear small dial 10 with a non-circular central aperture 18 adapted to receive the non-circular end 19 of the central shaft 20 which may, if desired, project through and have bearing in the central aperture 4 of the rear face plate 3. The other end of the shaft 20 also has a non-circular portion 21 adapted to fit into the non-circular socket provided in the turning arm 22.

The central or large diameter dial 9 has suitable connection with the end of the sleeve 23 which is rotatable on the central shaft and has the end thereof, which is projected through the central aperture 4 of the front face plate equipped with the turning knob 24.

The front small diameter dial 8 is secured in any approved manner upon the end of a sleeve 25 rotatable upon the sleeve 23 before mentioned and which also projects through the front face plate where it is equipped with a turning arm 26 similar in size and shape to arm 22 mounted on the central shaft 20, the said arms 22 and 26 being secured together, as at 27, to turn in unison. It will be observed that the arms 22 and 26 are so shaped and positioned that the turning knob 24 is mounted between the same providing a compact and easily operable set of controls for the dials.

The numerical indications on the reverse faces of the dial 9 are indicated at 28, it being understood that they are reversely positioned so that when rotated to any particular position a like number will be exhibited through both of the windows in the opposite plate 3. The numerical indications of each of the small dials are indicated at 29 and are positioned as hereinbefore described. By thus providing the dials with numerals from 0 to 9, it is possible to exhibit through the windows of the face plates any numbers from 0 to 99½.

In operation, assuming that the control lever 16 is positioned in the neutral or central depression of the control slot 6 all of the dials are in the unlocked condition and may be freely rotated through their respective agency to bring to view any of the numbers indicated thereon.

Assuming that it is desired to bring to view, at opposite sides of the device, the numeral "26", indicating the price of gasoline or some other commodity for a particular day or period, the knob 24 would be rotated to impart rotation to the large dial 9 to bring the numerals 6 to view through the oppositely positioned windows 5. When this has been accomplished the control lever 16 would be moved part way toward the left end of the slot 6. This movement will cause one of the stop pins 12 of the right hand arm 13 to move into the stop notches 11 of the dial 9 locking the same against rotation while permitting the small dials to remain free to rotate.

Then by utilizing the turning arms 22 and 26 the dials 8 and 10 may be rotated in unison to bring the numerals 2 to position for being exhibited through the windows 5 to cooperate with the numerals 6 before mentioned in exhibiting the desired price, namely, 26.

Should it have been desired to exhibit the price 26½ the function of the locking devices would be similar to that just above described except that the movement would be reversed, the control lever 16 being moved toward the right and the left hand arm 13 brought into locking position. This movement of the left hand arm 13 would cause the same and the other arm 13 to move into position, not only for locking the dials to their adjusted positions but also for exhibiting the "½" indication printed thereon, as illustrated in Figure 2 of the drawings.

After the small dials 8 and 10 have been rotated to the desired position, as before described, the movement of the control lever 16 to the end of the slot 6 in the respective direction will be completed, thereby bringing the stop pins 12 of the respective arm 13 into engagement with the stop notches of the said small dials, thereby locking all of the dials to their adjusted positions. It is for this reason namely, the continued movement of the locking pins for accomplishing the initial locking of the large diameter dial, that the lock notches of that large dial are provided with radial inward extensions, as hereinbefore mentioned.

In the foregoing description, I have disclosed an indicating device that is of simple and compact structure, economical to manufacture and in which the parts are so constructed as to ensure efficient operation for their intended purpose and in a manner overcoming the danger of breakage and expense in the way of replacing worn or broken parts.

From the foregoing description, taken in connection with the accompanying drawings, it is thought that the novel details of construction, the manner of operation and the advantages of my invention will be readily apparent to those skilled in the art.

What I claim is:

1. In a device of the class described, a housing having display windows, shiftable indicator devices in the housing and having indicia thereon adapted to be displayed through the windows, means for shifting the indicator devices to vary the indications displayed through the windows, and lock and indicator members movable into and out of engagement with the indicator devices to lock them to or release them from adjusted positions and having indicia thereon to be displayed through the windows at times.

2. In a device of the class described, a housing having display windows, shiftable indicator devices in the housing and having indicia thereon adapted to be displayed through the windows, and lock and indicator members having indicia thereon and movable in one direction to lock the indicator devices to an adjusted position and to hide the indicia on said members and in another direction to lock the indicator devices to an adjusted position and to display the indicia on said members through the windows and in cooperation with the indicia on the indicator devices.

3. In a device of the class described, a housing including face plates mounted in opposed spaced relation and having a display window, a large indicator dial, and a small indicator dial, the dials being movably mounted and each having indicia thereon adapted to be displayed through the window and lock notches in the edges thereof, and a shiftable dial locking member adapted when moved through part of its range of action to engage the notches of the large dial to lock it against movement while permitting free movement of the small dial, and when moved the remainder of its range to engage the large dial and the small dial to lock them both against movement.

4. In a device of the class described, a housing including face plates mounted in opposed spaced relation and having a display window, a large indicator dial, and small indicator dial, the dials being movably mounted and each having indicia thereon adapted to be displayed through the window and lock notches in the edges thereof, those of the large dial having inward radial extensions, and a shiftable dial locking member having locking pins projecting therefrom and adapted when moved through part of its range of action to bring certain of its pins into engagement with the notches of the large dial to lock it against movement and when moved the remainder of its range to bring other of the pins into engagement with the notches of the small dial to lock it against movement, the first mentioned pins moving into the radial extensions of said large dial notches during such remainder of movement.

5. In a device of the class described, a housing including face plates mounted in opposed spaced relation and each having a display window, a large indicator dial and a pair of small indicator dials positioned one at each side of the large dial, said dials having annular edge portions marked with indicia adapted to be selectively displayed through the windows, means operable from without the housing for selectively moving both small dials in unison and the large dial individually, and other means operable from without the housing for locking the dials against movement at selected positions.

6. In a device of the class described, a housing including face plates mounted in opposed spaced relation and each having a display window, a large indicator dial and a pair of small indicator dials positioned one at each side of the large dial, said dials having annular edge portions marked with indicia adapted to be selectively displayed through the windows, means operable from without the housing for selectively moving both small dials in unison and the large dial individually, and other means operable from with out the housing and adapted when moved a certain distance to engage the large dial only to secure it against movement and when moved an additional distance to engage one small dial also to hold all of the dials against movement.

7. In a device of the class described, a housing including face plates mounted in opposed spaced relation and each having a display window, a large indicator dial and a pair of small indicator dials positioned one at each side of the large dial, said dials having annular edge portions marked with indicia adapted to be selectively displayed through the windows, means operable from without the housing for selectively moving both small dials in unison and the large dial individually, and dial locking and indicating devices operable from without the housing and comprising locking arms having indicia thereon and adapted when moved in one direction to lock the dials to selected positions and when moved in another direction to lock the dials to their selected positions and to display the indicia thereon through the windows in cooperation with the display made by the dials.

FRANK RICCA.